(12) United States Patent
Ahn et al.

(10) Patent No.: US 7,534,480 B2
(45) Date of Patent: *May 19, 2009

(54) MULTI-LAYER SUPER RESOLUTION OPTICAL DISC

(75) Inventors: Kun Ho Ahn, Seoul (KR); Keum Cheol Kwak, Seoul (KR)

(73) Assignee: LG Electronics Inc., Seoul (KR)

( * ) Notice: Subject to any disclaimer, the term of this patent is extended or adjusted under 35 U.S.C. 154(b) by 477 days.

This patent is subject to a terminal disclaimer.

(21) Appl. No.: 11/131,269

(22) Filed: May 18, 2005

(65) Prior Publication Data

US 2005/0259563 A1 Nov. 24, 2005

(30) Foreign Application Priority Data

May 19, 2004 (KR) .................. 10-2004-0035519

(51) Int. Cl.
*B32B 3/02* (2006.01)
(52) U.S. Cl. ............... 428/64.4; 428/64.5; 430/270.12; 430/270.13

(58) Field of Classification Search ............... 428/64.4, 428/64.5, 64.6; 430/270.12, 270.13
See application file for complete search history.

(56) References Cited

U.S. PATENT DOCUMENTS

| | | | |
|---|---|---|---|
| 6,524,766 B1 * | 2/2003 | Ariyoshi et al. | 430/270.13 |
| 6,961,300 B2 * | 11/2005 | Cheong et al. | 369/275.1 |
| 6,987,721 B2 * | 1/2006 | Yamamoto et al. | 369/94 |
| 7,232,598 B2 * | 6/2007 | Ahn et al. | 428/64.4 |
| 2005/0249065 A1 * | 11/2005 | Kim et al. | 369/47.1 |

* cited by examiner

*Primary Examiner*—Elizabeth Mulvaney
(74) *Attorney, Agent, or Firm*—Birch, Stewart, Kolasch & Birch, LLP

(57) ABSTRACT

Disclosed is a multi-layer super resolution optical disc. In the multi-layer super resolution optical disc, at least two recording layers, each of which comprises at least two mask layers and impact absorption layers formed between the mask layers, are laminated, and intermediate layers of polymer thermo-set by ultraviolet rays are formed between the recording layers. Accordingly, jitter characteristics for recording marks are improved, and recording density is enhanced.

10 Claims, 5 Drawing Sheets

Structure of super resolution optical disc

Structure of conventional super resolution optical disc

Picture of conventional super resolution optical disc taken using transmission electron microscope

Picture of conventional super resolution optical disc taken using transmission electron microscope

Structure of super resolution optical disc

MULTI-LAYER SUPER RESOLUTION OPTICAL DISC

BACKGROUND OF THE INVENTION

1. Field of the Invention

The present invention relates to an optical recording medium, and more particularly to a multi-layer super resolution optical disc, which has enhanced signal quality and enhanced recording density.

2. Description of the Related Art

Generally, currently available optical discs have a storage capacity of about 4.7 GB (gigabytes) in the DVD (Digital Versatile Disc) standard using red laser or of about 25 GB in the BD (Blue-ray Disc) standard using blue laser, which has been commercialized recently. However, in order to record and reproduce a huge amount of information for applications, such as high definition TV or E-medicine, there is a need to provide an information storage technology with a higher density.

For instance, in order to record a data stream of high definition digital video, recently available on the market, there is a need to provide a storage medium, which has a storage capacity of 20 GB or more and is able to record the data at a speed of 25 Mbps or more.

Moreover, it is anticipated that technology capable of recording 100 GB or more of information/CD-size media will be required after 2005 and technology capable of recording terabytes of data on CD-size media will be required after 2010. For this purpose, it is necessary to record the information at a high density and a high speed.

In such various multimedia environments, research and development of various types of multi-functional information storage technology has been conducted.

Among the information storage technologies, optical recording technology is most spotlighted and widely used due to its merits. Specifically, an optical recording medium is capable of being easily detached from its drives, and storing a large amount of information data. As a necessary function in the multimedia environment, random access of data on the optical recording medium is allowed in the optical recording technology. Further, high data integrity and low manufacturing costs are provided.

As a method for increasing the recording density of the optical recording medium, a method of decreasing the size of the laser beam incident on the recording medium is used. As developed at present, the reduction of the size of the laser beam incident on the recording medium is accomplished by decreasing the wavelength of the laser or increasing a numerical aperture of an objective lens. The size of bits recorded on the medium is in proportion to the wavelength of the laser, and is in inverse proportion to a numerical aperture (NA) of an objective lens.

However, currently, methods for increasing recording density by using a short wavelength, such as a blue laser (405 nm), together with a high numerical aperture (NA=0.85), have substantially arrived at the theoretical limits of optics, so there is a need to develop a new technology for realizing a higher storage capacity.

Accordingly, as a plan for developing an optical memory, which is compatible with the existing CD or DVD and is also capable of storing information with a density several hundreds times higher than the storage capacity of the existing CD, that is, 650 MB, research into an optical disc using a super resolution phenomenon, that is a super resolution optical disc, has been conducted.

It is expected that the super resolution technology can remarkably reduce the size of a recording mark while using a conventional laser optical pickup system, thereby increasing the recording density. The super resolution technology uses a near-field effect by a focused laser beam.

Among the super resolution technologies, according to a WORM (Write Once Read Many)-type super resolution technology, recording marks are not formed on a crystal/non-crystal reversible phase transformation-type recording layer available for the DVD. Instead, an oxide thin film, such as $AgO_x$, $PtO_x$ and the like, of a mask layer in a recordable optical disc is decomposed by the laser beam, and cavities formed from the decomposition and nanosized metal particles precipitated in the mask layer form near-field while acting as scattering cores such that the cavities and particles act as a recording layer.

Here, dielectric thin films consisting of a $ZnS$—$SiO_2$ based component are formed at upper and lower portions of the oxide thin film of the mask layer, respectively, in consideration of optical, thermal, and mechanical properties of the oxide thin film. Further, as for a substrate, polycarbonate (PC) is mainly used, since PC is light, has good injection properties, and can increase carrier-to-noise ratio (CNR) due to a low birefringence when the laser is incident thereon.

FIG. 1 is a view illustrating the structure of a conventional super resolution optical disc. By irradiating the laser beam on the super resolution optical disc, the thermally decomposed marks are locally recorded in the thin film laminated on a groove or a land, and by irradiating a low power laser thereon, a signal caused by difference of reflection rate between the mark and the background (space), which is not formed with the marks, is detected.

At this time, a jitter value becomes an important standard for demonstrating a reproduction quality. The jitter value is an amount represented by a statistical variation of the values of time differences between a clock (PLL clock) generated from a reproduction signal and a border of each recording mark determined from the reproduction signal. Specifically, the jitter value is a value represented by a percentage of the standard deviation of the values of time differences between a leading edge of the mark and the PLL clock and between a trailing edge of the mark and the PLL clock, divided by 1 T.

Although there are various causes influencing the jitter value and various aspects influencing the jitter value are not simple, especially, Inter-Symbol Interference (ISI) caused by the shape of the marks formed on the recording medium and by relation of marks and spaces between the marks plays a very important role in influencing the jitter value. That is, in a process for analyzing the signal read by a pickup unit, the relation between the shape of the mark recorded on the recording medium and the space between the marks determines the quality of the reproduction signal. Accordingly, it is very important to provide a technology which can record the marks on the recording medium with a desired shape in order to reduce the jitter value by improving the quality of the reproduction signal.

According to research into the conventional super resolution optical disc using a single mask layer, as shown in FIG. 2, the mask layer, which is several nanometers thick, [for example, PtOx (4 nm)], is expanded to have a thickness of ten times or more through the recording process, and continues to expand through the reproduction process after recording. An expanded portion is a Ge—Sb—Te or Ag—In—Sb—Te thin film layer, which is used as a recording layer in a typical phase transformation type optical disc. The expansion is attributed to the fact that the mask layer is decomposed by the focused laser beam and a phase transformation material having a low melting point is partially melted or decreased in viscosity, thereby causing the remaining mask layer to easily expand toward the decomposed portion thereof.

Further, as shown in FIG. 3, in case of a super resolution optical disc 101, which has a symmetrical structure of a dielectric layer (for example, ZnS—SiO$_2$) and a recording layer (for example, Ag—In—Sb—Te) at upper and lower portions of the mask layer (for example, PtO$_x$), each mark in the mask layer is expanded into an oval-shape.

Here, since the laser beam has a temperature variation corresponding to a Gaussian distribution at the cross section thereof, there is a considerable difference of volume expansion between the center of the recording marks and an outer periphery thereof, and the degree of volume expansion is gradually decreased toward the outer periphery of the recording marks.

Due to such a non-uniform expansion of the mask layer, the recording marks are not uniform, and the reflection rate differs between the center of the marks and the outer periphery thereof. Moreover, the border between the outer periphery of the marks and the space between the marks is poorly defined. Accordingly, there are problems in that the quality of the reproduction signal of the optical disc is lowered and in that integrity of reproduction performance cannot be secured.

Moreover, although there have been continuous efforts to increase the storage capacity of the super resolution optical disc, an effective solution for this problem has not been discovered yet.

SUMMARY OF THE INVENTION

The present invention has been made to solve the above problems, and it is an object of the present invention to provide a super resolution optical disc, which is capable of enhancing the recording density by employing a multi-layer structure.

It is further object of the present invention to provide a super resolution optical disc, which is capable of enhancing the quality of the reproduction signal for recording marks.

It is another object of the present invention to provide a super resolution optical disc, in which the difference of the reflection rate between central portion and outer portion of the recording marks gets smaller and the border between the recording marks and spaces becomes well defined.

In accordance with the present invention, the above and other objects can be accomplished by the provision of a multi-layer super resolution optical disc, comprising at least two recording layers each of which comprises at least two mask layers and impact absorption layers formed between the mask layers; and intermediate layers formed between the recording layers.

Preferably, each of the intermediate layers consists of polymer material thermo-set by ultraviolet rays, and the thickness of each of the intermediate layers is in range of 10 um to 150 um.

And, each of the mask layers consisting of a metallic compound comprising O$_x$ or N$_x$ is decomposed into nanosized metallic particles and oxygen or nitrogen when the mask layers are heated at a predetermined temperature or more. And, each of the impact absorption layers consists of at least one material, selected from Ge, Sb, Te, Ag, In, Sn, Zn, Pb, Bi, Ti, Se, S, Al, Ga, Cd and I which have a low melting point.

Each of the recording layers can be formed such that a first dielectric layer, a first mask layer, an impact absorption layer, a second mask layer, and a second dielectric layer are sequentially laminated therein. In this case, each of the dielectric layers consists of at least one material selected from ZnS—SiO$_2$ and SiN$_x$.

Each of the recording layers can further comprise diffusion preventing layers formed between the mask layers and the impact absorption layers, wherein each of the diffusion prevention layers consists of at least one material selected from ZnS, SiO$_x$, GeN, and SiN$_x$. In this case, each of the recording layers can be formed such that a first dielectric layer, a first mask layer, a first diffusion preventing layer, an impact absorption layer, a second diffusion preventing layer, a second mask layer, and a second dielectric layer are sequentially laminated therein.

BRIEF DESCRIPTION OF THE DRAWINGS

The foregoing and other objects and features of the present invention will be more clearly understood from the following detailed description taken in conjunction with the accompanying drawings, in which.

DETAILED DESCRIPTION OF PREFFERRED EMBODIMENTS

Preferred embodiments will now be described in detail with reference to the accompanying drawings.

In accordance with the present invention, a multi-layer super resolution optical disc comprises a plurality of layers and intermediate layers formed between the layers.

Figure 4:
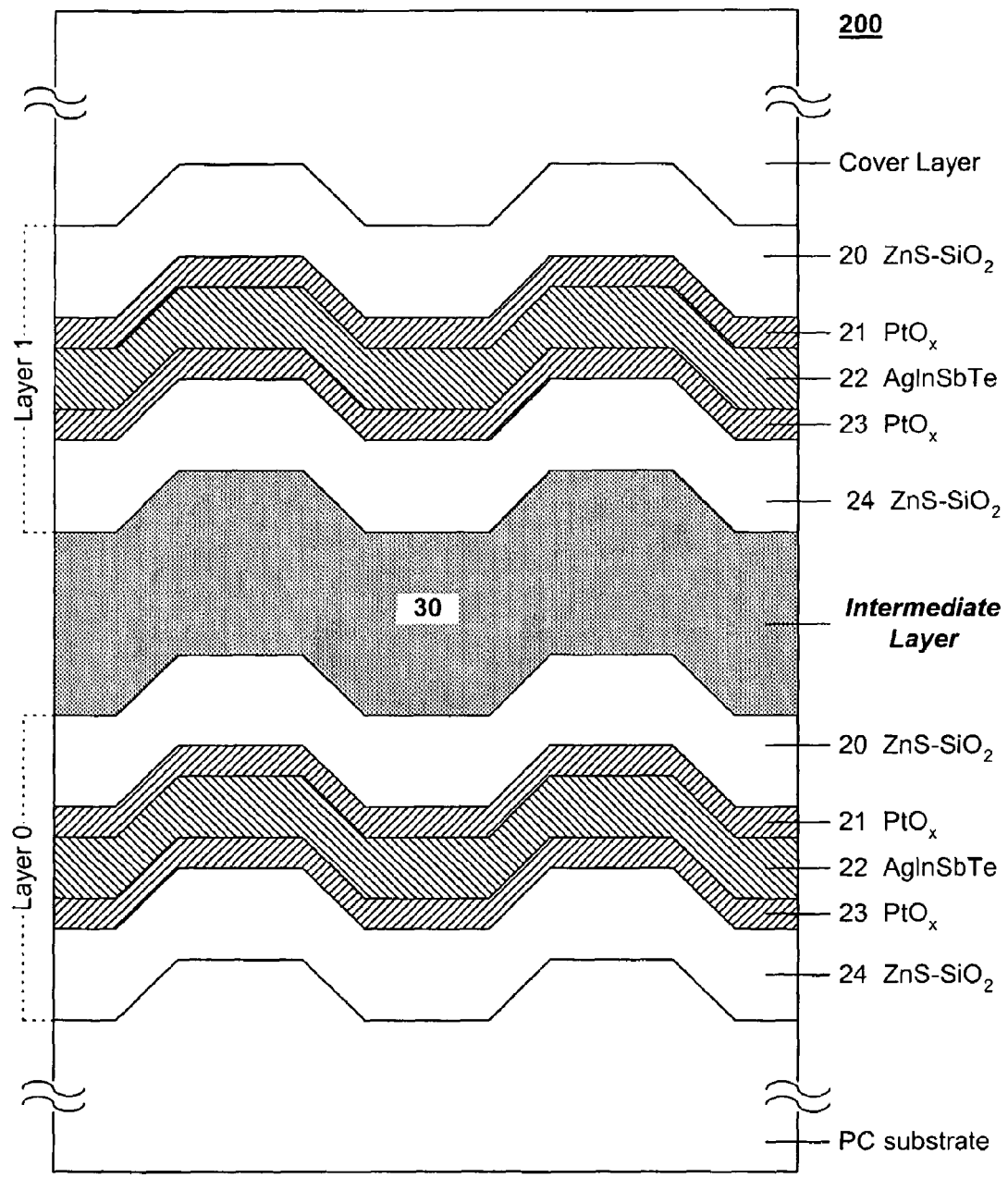
FIG. 4 is a view illustrating the structure of a super resolution optical disc in accordance with the present invention.

For example, a dual-layer super resolution optical disc in accordance with one embodiment of the present invention comprises a first layer (Layer 0) and a second layer (Layer 1), in each of which a first dielectric layer 20, a first mask layer 21, an impact absorption layer 22, a second mask layer 23, and a second dielectric layer 24 are sequentially laminated, as shown in FIG. 4.

And, an intermediate layer (a spacer or a space layer) is formed between the first layer and the second layer in the dual-layer super resolution optical disc. The intermediate layer may consist of polymer material thermo-set by ultraviolet rays, and the thickness of the intermediate layer may be in range of 10 um to 150 um.

The mask layers 21 and 23 may consist of a metallic compound (MO$_x$ or MN$_x$) comprising O$_x$ or N$_x$, which is easily decomposed into nanosized metallic particles and gas when heated at a predetermined temperature or more. For the impact absorption layer 22, a phase transformation material for recording layers having a low melting point, such as Ge, Sb, Te, Ag, In, Sn, Zn, Pb, Bi, Ti, Se, S, Al, Ga, Cd, I or the like, can be used. The dielectric layers 20 and 24 may consist of ZnS—SiO$_2$ or SiN$_x$.

Further, diffusion preventing layers may be additionally formed between the mask layers 21 and 23 and the impact absorption layer 22, and may consist of ZnS, $SiO_x$, GeN, $SiN_x$ or the like.

The laminated structure of an arbitrary layer included in the multi-layer super resolution optical disc in accordance with the present invention will be described in detail as follows.

Figure 5:
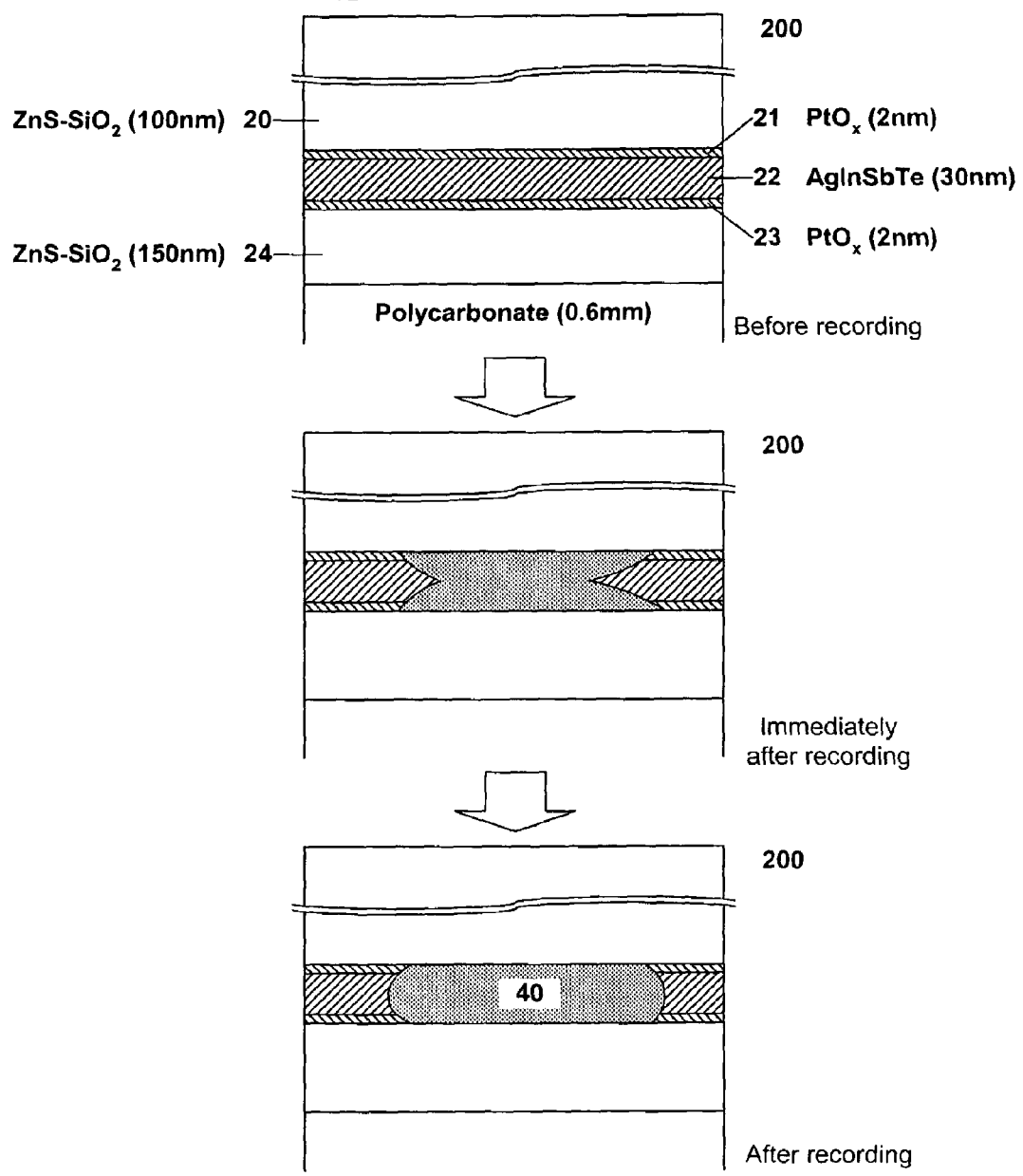
FIGS. 5 and 6 are views respectively illustrating the laminated structure of an arbitrary layer included in the super resolution optical disc in accordance with each embodiment of the present invention.

FIG. 5 is a view illustrating the laminated structure of an arbitrary layer included in the super resolution optical disc in accordance with one embodiment of the present invention. In each layer of the multi-layer super resolution optical disc of the FIG. 5, a first dielectric layer 20, a first mask layer 21, an impact absorption layer 22, a second mask layer 23, and a second dielectric layer 24 are sequentially laminated.

Figure 6:
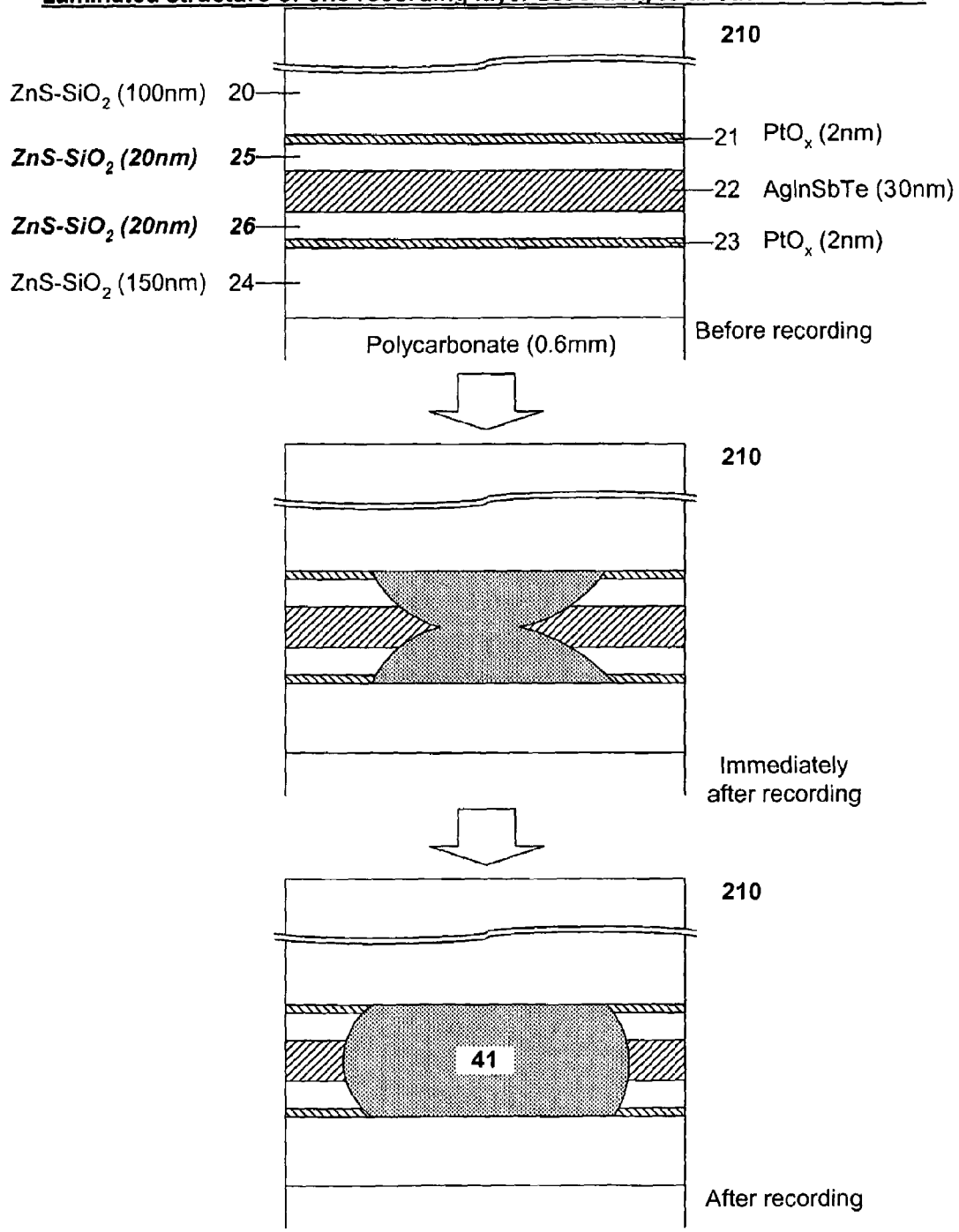

FIG. 6 is a view illustrating the laminated structure of an arbitrary layer included in the super resolution optical disc in accordance with another embodiment of the present invention. Each layer of the multi-layer super resolution optical disc of the FIG. 6 comprises two mask layers 21 and 23 and an impact absorption layer 22 formed between the two mask layers 21 and 23, and further comprises diffusion preventing layers 25 and 26 formed between the mask layers 21 and 23 and the impact absorption layer 22.

Materials and thickness of the respective layers shown in FIGS. 5 and 6 are merely examples, and can be optionally varied for enhancing optical characteristics.

Each of the mask layers 21 and 23, used for forming recording marks, is thermally decomposed into nanosized metal particles and oxygen or nitrogen at a portion thereof by the laser beam for writing, and is then subjected to a rapid volume expansion.

Here, an impact absorption layer having a relatively low melting point, that is, the impact absorption layer 22, which is used as phase transformation material for a recording layer in a phase transformation type optical disc, is melted or decreased in viscosity by the laser beam for writing, thereby playing a sufficient role of contributing to the volume expansion of the mask layers.

Immediately after recording, namely immediately after the laser beam for writing is focused on the optical disc, the two mask layers 21 and 23 are thermally decomposed, and rapidly expand toward the impact absorption layer 22 while generating oxygen or nitrogen. Then, at a predetermined time after recording, owing to the generated oxygen or nitrogen the mask layers 21 and 23 are rapidly expanded in volume thereof, meet each other while pushing the impact absorption layer 22 up and down, and then pushes the impact absorption layer 22 outward laterally with a higher pressure Generally, when recording data on the mask layers, the mask layers are locally decomposed into nanosized metallic particles and oxygen or nitrogen by the laser beam for writing, forming recording marks having a size of a diffraction limit or less. Further, when reproducing the recording marks, there is a near-field effect generated from the nanosized metallic particles by the laser beam having a low energy, and a rapid variation in diffraction rate in cavities of oxygen or nitrogen, thereby proving the reproduction signal.

When the laser beam for writing is locally irradiated on the mask layers 21 and 23, each of the thin films of platinum (or silver) oxide (or nitride) constituting the mask layers is decomposed into platinum (or silver), which is the nanosized metallic particles, and oxygen (or nitrogen) cavities as the gas, and is subjected to a rapid volume expansion.

At this time, it is central portion of the expanded recording mark that contributes to overall magnitude of the reproduction signal, and it is the outer portion of the expanded recording marks, especially the leading portion and trailing portion of the expanded recording mark that contributes to quality of the reproduction signal.

If the mark is well defined at the outer periphery of the mark, the difference of an optical performance index such as the reflection rate between the outer periphery of the mark and the space becomes increased, and the slope of the reproduction signal measured at the border between the mark and the space becomes steeper, thereby providing an improved jitter value of the signal.

Figure 1:
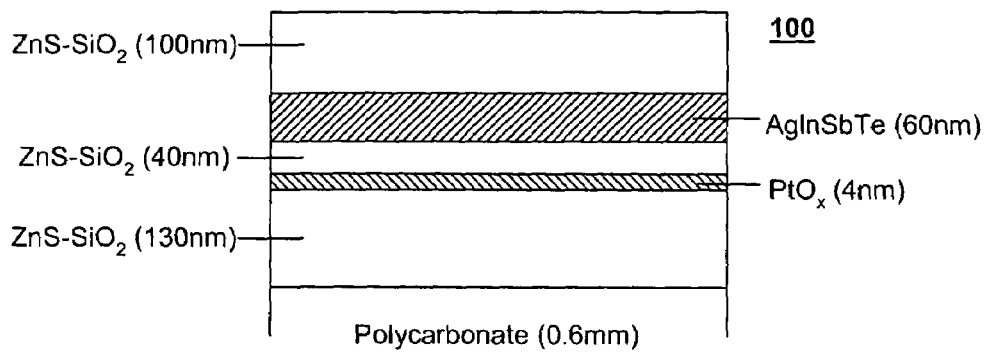
FIG. 1 is a view illustrating the structure of a conventional super resolution optical disc.
Figure 2:
FIGS. 2 and 3 are pictures of the conventional super resolution optical disc taken using a transmission electron microscope, respectively.
Figure 3:

As shown in FIGS. 1 to 3, when using the single mask layer, the slope of the optical performance index becomes much gentler or slower at the outer portion of the mark. Such characteristic of the optical performance index influences ISI (Inter-Symbol Interference), causing reduction in quality of the signal.

However, when 2 or more mask layers are formed in the super resolution optical disc, the optical performance index at the central portion of the mark becomes more favorable, the difference of the optical performance index between the central portion and the outer portion of the mark becomes smaller, and the optical performance index at the outer portion of the mark comes to change more abruptly, than when a single mask layer is formed in the super resolution optical disc. So, the influence of the outer portion of the mark, in which the optical performance is poor than the central portion of the mark, on the reproduction signal comes to relatively decrease.

Accordingly, the quality of the reproduction signal is enhanced at the border between the mark and the space, a thermal stability is also remarkably enhanced due to the uniform shape of the marks, and a stable carrier to noise ratio (CNR) is achieved even if the laser light is irradiated only for a short period of time.

Figure 7:
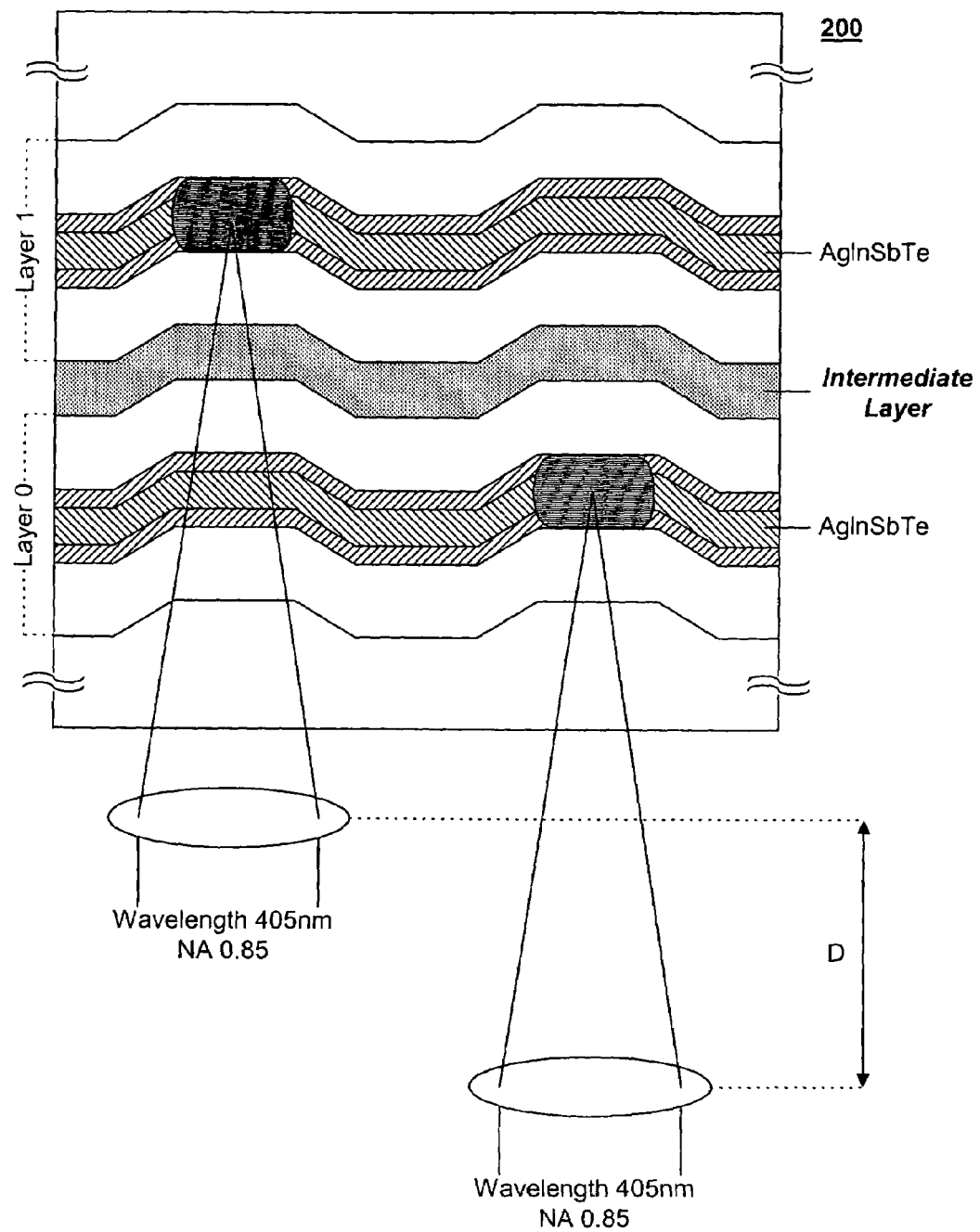
FIG. 7 is a view illustrating a process in which, while an objective lens moving up and down in a focusing direction, recording marks are recorded in each layer of a 2-layer super resolution optical disc in accordance with the present invention.

FIG. 7 is a view illustrating a process in which, while an objective lens moving up and down in a focusing direction, recording marks are recorded in each layer of a 2-layer super resolution optical disc in accordance with the present invention.

As shown in FIG. 7, because recording marks can be formed on each layer of a first layer (Layer 0) and a second layer (Layer 1), the 2-layer super resolution optical disc can achieve a storage capacity two times higher than a 1-layer super resolution optical disc.

When recording marks are to be recorded on the second layer (Layer 1) while recording marks being recorded on the first layer (Layer 0), a focus-controlling operation is necessary that shifts the objective lens upward by a predetermined distance D between the first layer (Layer 0) and the second layer (Layer 1).

As apparent form the above description, according to the present invention, the jitter characteristics for the recording marks are improved, and the recording density is enhanced.

It should be understood that the embodiments and the accompanying drawings as described above have been described for illustrative purposes and the present invention is limited by the following claims. Further, those skilled in the art will appreciate that various modifications, additions and substitutions are allowed without departing from the scope and spirit of the invention as set forth in the accompanying claims.

What is claimed is:

1. A multi-layer super resolution optical disc, comprising:
   at least two recording layers, each of which comprises at least two mask layers and impact absorption layers formed between the mask layers; and
   intermediate layers formed between the recording layers wherein a thickness of each of the mask layers is 2 nm, and a thickness of the impact absorption layer is 30 nm.

2. The optical disc as set forth in claim 1, wherein each of the intermediate layers consists of polymer material thermoset by ultraviolet rays.

3. The optical disc as set forth in claim 2, wherein the thickness of each of the intermediate layers is in range of 10 um to 150 um.

4. The optical disc as set forth in any one of claims 1 to 3, wherein each of the mask layers consists of a metallic compound comprising $O_x$ or $N_x$, and is decomposed into nano-sized metallic particles and oxygen or nitrogen when the mask layers are heated at a predetermined temperature or more.

5. The optical disc as set forth in any one of claims 1 to 3, wherein each of the impact absorption layers consists of at least one material, selected from Ge, Sb, Te, Ag, In, Sn, Zn, Pb, Bi, Ti, Se, S, Al, Ga, Cd and I which have a low melting point.

6. The optical disc as set forth in any one of claims 1 to 3, wherein a first dielectric layer, a first mask layer, an impact absorption layer, a second mask layer, and a second dielectric layer are sequentially laminated in each of the recording layers.

7. The optical disc as set forth in claim 6, wherein each of the dielectric layers consists of at least one material selected from $ZnS\text{-}SiO_2$ and $SiN_x$.

8. The optical disc as set forth in any one of claims 1 to 3, further comprising:

diffusion preventing layers formed between the mask layers and the impact absorption layers.

9. The optical disc as set forth in claim 8, wherein each of the diffusion prevention layers consists of at least one material selected from ZnS, $SiO_2$, GeN, and $SiN_x$.

10. The optical disc as set forth in claim 8, wherein a first dielectric layer, a first dielectric layer, a first mask layer, a first diffusion preventing layer, an impact absorption layer, a second diffusion preventing layer, a second mask layer, and a second dielectric layer are sequentially laminated in each of the recording layers.

* * * * *